United States Patent
Chang

(10) Patent No.: US 6,922,837 B2
(45) Date of Patent: Jul. 26, 2005

(54) DISC EJECTION DEVICE

(75) Inventor: Yen-Jen Chang, Kaohsiung (TW)

(73) Assignee: BenQ Corporation, Taoyuan (TW)

( * ) Notice: Subject to any disclaimer, the term of this patent is extended or adjusted under 35 U.S.C. 154(b) by 131 days.

(21) Appl. No.: 10/666,193

(22) Filed: Sep. 18, 2003

(65) Prior Publication Data

US 2004/0062173 A1 Apr. 1, 2004

(30) Foreign Application Priority Data

Sep. 18, 2002 (TW) ........................................ 91121310 A

(51) Int. Cl.$^7$ ............................................. G11B 17/03
(52) U.S. Cl. ..................................................... 720/609
(58) Field of Search ................................ 720/609, 610

(56) References Cited

U.S. PATENT DOCUMENTS 6,266,311 B1 * 7/2001 Song et al. .................. 720/609

FOREIGN PATENT DOCUMENTS

JP          10-177760         6/1998

* cited by examiner

Primary Examiner—David Davis
(74) Attorney, Agent, or Firm—Snell & Wilmer L.L.P.

(57) ABSTRACT

The present invention relates to a disc ejection device of a disc drive to urgently eject a tray for holding a disc from the housing of the disc drive. The disc ejection device includes a first bar, a second bar, and a first protrusion. The first bar and the second bar are rotatably connected with the tray respectively. One end of the first bar sticks out of the panel of the disc drive, and the other end of the first bar is located touching against one end of the second bar. The second bar has a first latch located touching against the first protrusion which is connected with the housing. A user may move the stick-out end of the first bar to eject the tray.

10 Claims, 7 Drawing Sheets

DISC EJECTION DEVICE

CROSS REFERENCE TO RELATED APPLICATIONS

This Application claims priority to Taiwanese Patent Application No. 091121310 filed on Sep. 18, 2002.

FIELD OF INVENTION

The present invention provides an emergency ejection device for use in a disc drive to urgently eject a tray out of the disc drive.

BACKGROUND OF THE INVENTION

The general design of present disc drives provides users with several methods to insert a disc into a drive. The most popular method for disc drives is using an extendible tray to load a disc into the drive. The tray is slidably movably connected to the housing of the disc drive through tracks. Electronic control and a motor are usually used to control the ejection and withdrawal of a tray. When a user manipulates controls to eject a tray, the motor operates to move the tray to the end of the tracks. As for the drives in laptops, the motor operates to control the engagement status between the tray and the housing; then, a part of the tray is ejected out of the housing by the ejection device with springs. After that, a user may manually draw the tray to the end of the tracks to make the tray completely exposed.

However, the disc drive with this kind of tray usually has certain common problems. The tray cannot be ejected out of the drive when power supply is interrupted or when the computer is turned off. To take the disc out of the drive, a user must reboot the computer or turn on the computer again. The same condition also occurs when the computer is not functioning in a normal way or when it is shut down unexpectedly.

To deal with this problem, the present disc drives with disc trays all have an emergency ejection device. A typical design of an emergency ejection device is to have a hole on the panel of a drive. When the device comes to a situation that the tray must be urgently ejected, the user may use a pin to trigger the inner emergency ejection device through the little hole to eject the tray out of the drive.

SUMMARY OF THE INVENTION

The main aspect of the subject invention provides an emergency ejection device for use in a disc drive. The present invention can eject a tray with a disc in it out of the drive urgently if the power supply is interrupted or when the disc drive cannot control the tray normally.

Another aspect of the subject invention provides an emergency ejection device with a first bar that extends out of the panel of the disc drive. A user may eject the tray out of the drive by moving the first bar.

The disc drive has a tray and a housing, and the tray is movably connected with the housing. The emergency ejection device includes a first bar, a second bar and a first protrusion. The first and the second bar are rotatably connected with the tray. One end of the first bar sticks out of a panel of the disc drive, with the other end of the first bar located touching against one end of the second bar. The second bar has a first latch which is situated to correspond to the first protrusion of the housing.

When the first bar is in a first position, the first latch engages with the first protrusion to restrain the tray from moving out of the disc drive housing. When a user moves the first bar to a second position, the first bar then pushes the second bar to disengage the first latch from the first protrusion. Eventually, the tray may be partially ejected out of the housing with the assistance of an ejection device with springs.

The emergency ejection device further includes a sliding component connected with the tray. With the help of the sliding component, the first bar can stick out of the panel or move inside the panel.

DETAILED DESCRIPTION

The subject invention provides an emergency ejection device for use in a disc drive. In a preferred embodiment, the disc drive is a thin compact disc drive, particularly one for use in a laptop. The disc drive may also be a typical CD-ROM drive, a CD-R drive, a DVD drive or any other apparatus with similar functions.

Figure 1:
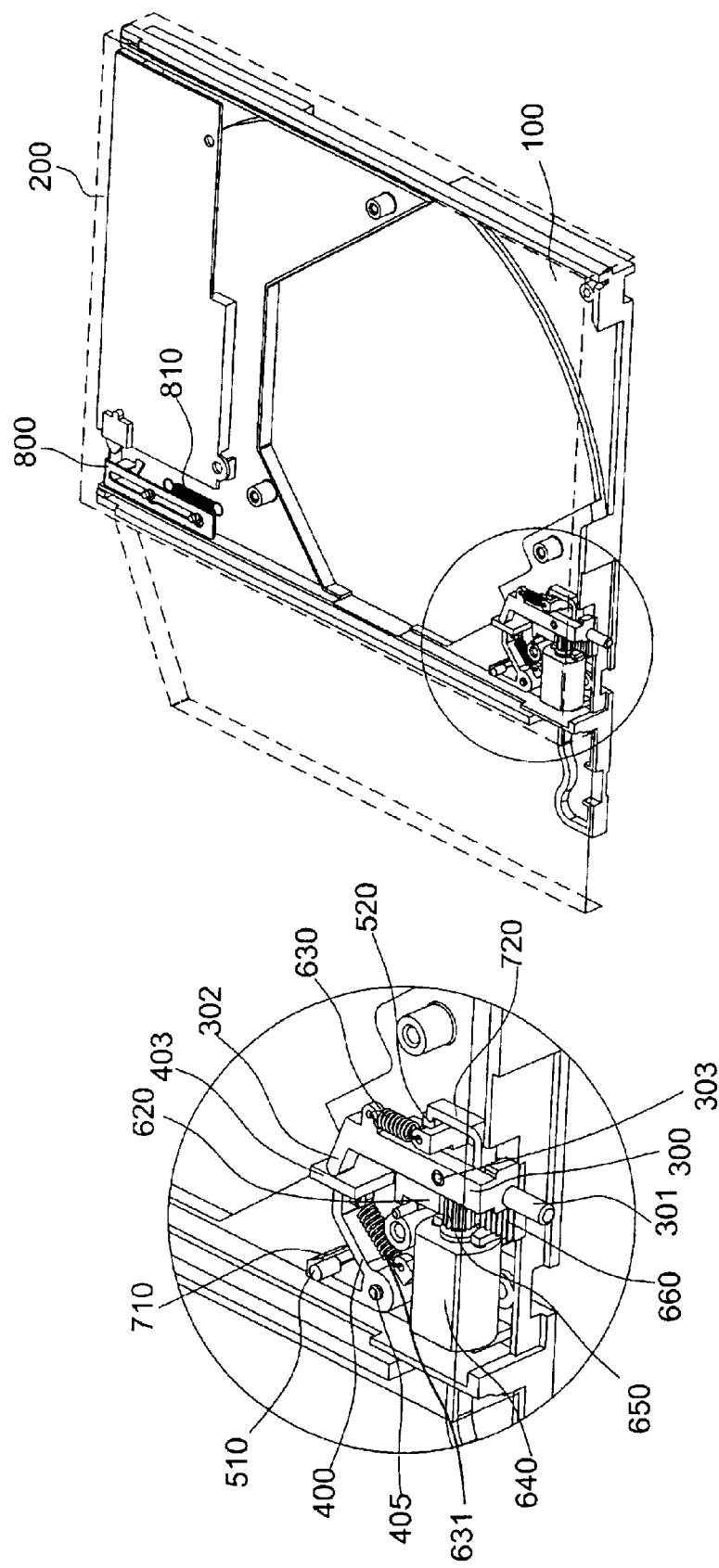
FIG. 1 is a perspective view showing the emergency ejection device of the subject invention.

FIG. 1 is a perspective view showing the first embodiment of the subject invention. A disc drive has a tray 100 and a housing 200; the tray 100 is used to hold a disc. The tray 100 is movably connected with housing 200. In particular, tray 100 is slidably connected with housing 200 via a sliding device. When the disc drive runs into power-cut or is not able to operate normally, and the tray 100 must be urgently ejected, the emergency ejection device of the subject invention can function to eject tray 100 for users to remove or place a disc on the tray.

As shown in FIG. 1, the emergency ejection device includes a first bar 300, a second bar 400 and a first protrusion 510. The first bar 300 has a first end 301, a second end 302 and a first supporting point 303. The first support point is a pivot 303. The first bar 300 is rotatably connected with tray 100 via the pivot 303. The first bar 303 is made of plastic materials. It can also be made of metals, synthetic materials or any other materials that provide similar functions.

The second bar 400 has a third end 403 and a first latch 710. The third end 403 is positioned corresponding to the second end 302. The third end 403 of the second bar 400 contacts with the second end 302 of the first bar 300. The second bar 400 is rotatably connected with tray 100. The second bar 400 further includes a second supporting point 405. The second supporting point 405 is a pivot 405. The second bar 400 is rotatably connected with tray 100 via the pivot 405.

The second bar 400 is made of plastic materials. In other embodiments, however, the second bar 400 can be made of metals, synthetic materials or any other materials that provide similar functions.

As shown in FIG. 1, a first protrusion 510 is formed on or connected with the housing 200 and engages with the first latch 710. The first protrusion 510 is a cylindrical protrusion. Nevertheless, the first protrusion part may also be in the form of a latch or any other shape that can engage with the first latch 710.

Figure 2A:
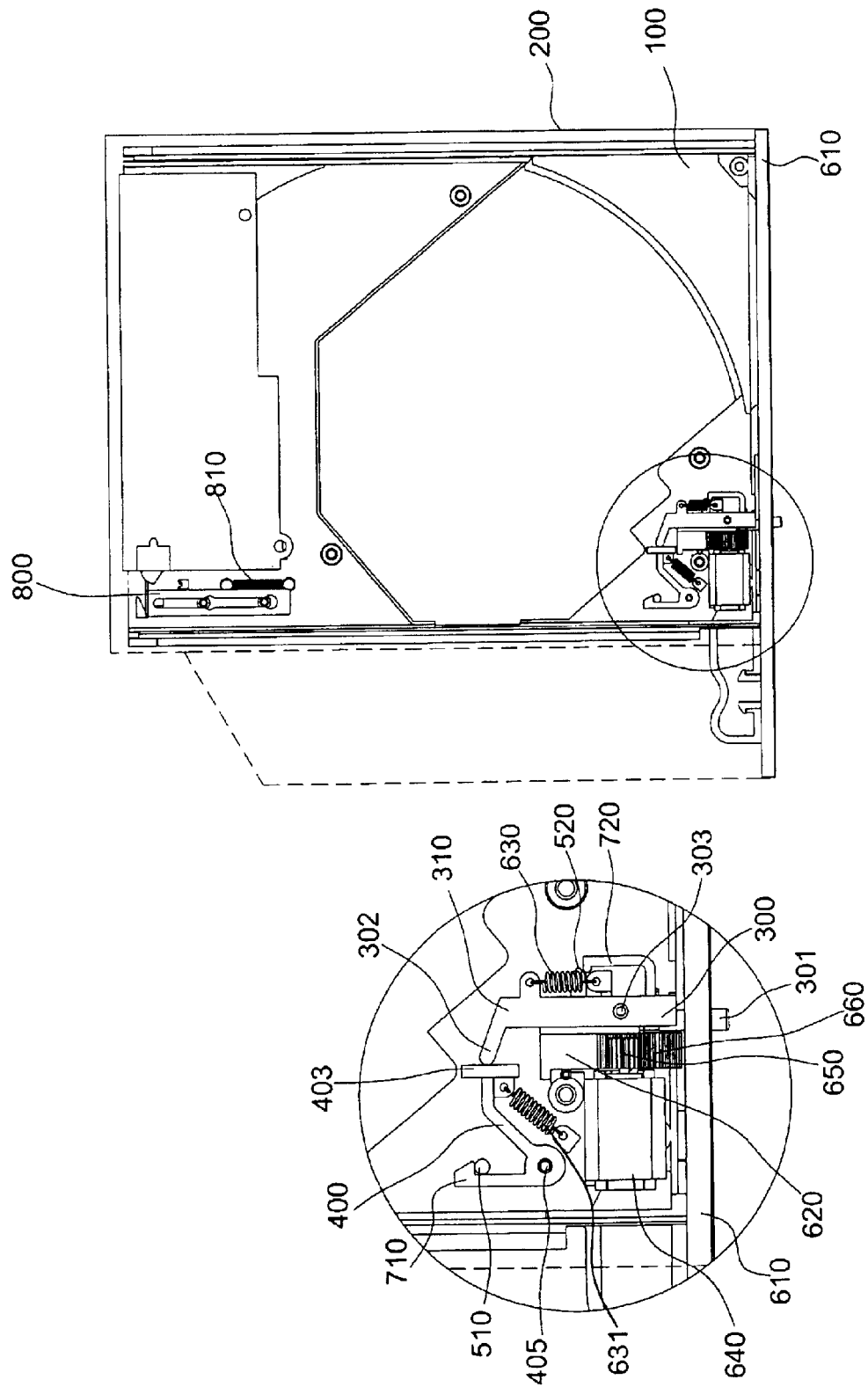
FIG. 2a shows a top view of the first bar in the first position.
Figure 2B:
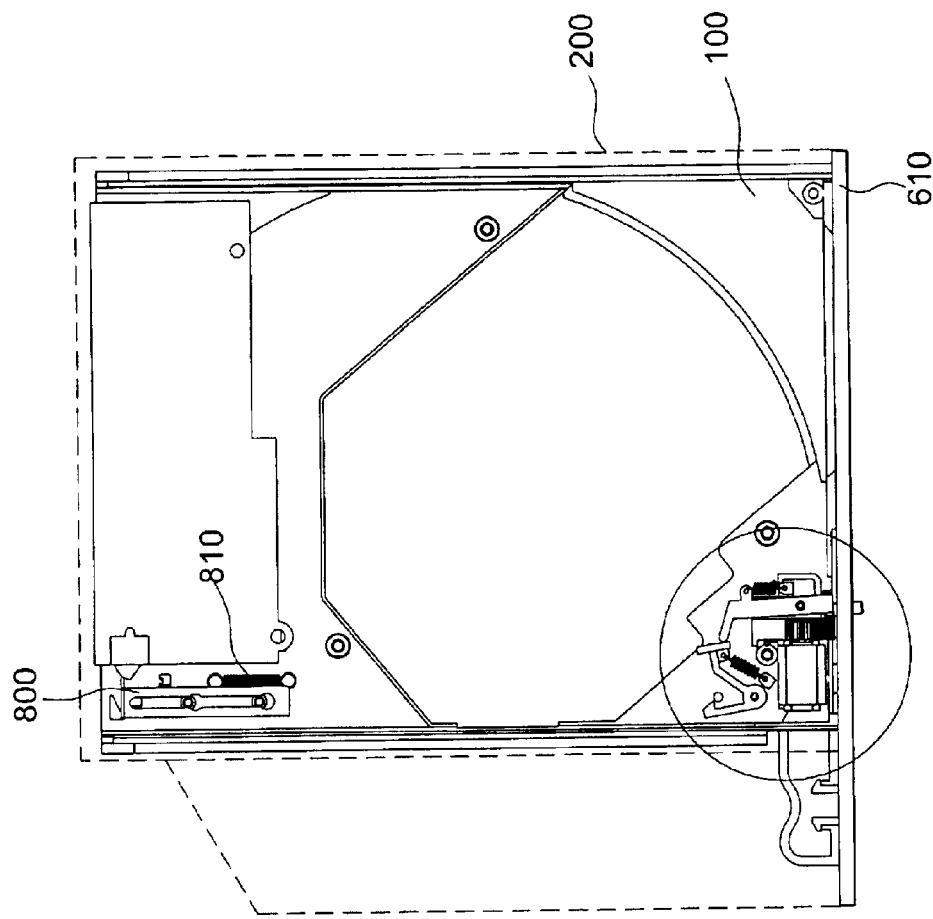
FIG. 2b shows a top view of the first bar in the second position.
Figure 2B:
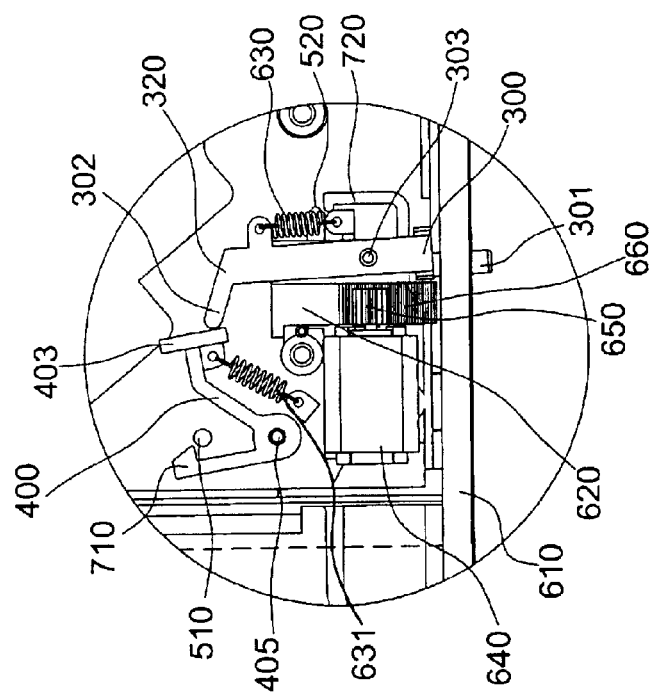

Please refer to FIGS. 2a and 2b. The first bar 300 may rotate from the first position 310 to the second position 320. A user may push aside the first end 301 of the first bar 300 to move the first bar 300 between the first position 310 and the second position 320. As shown in FIG. 2a, when the first bar 300 is in the first position 310, the first latch 710 engages with the first protrusion 510 to keep the tray 100 within the housing 200.

As shown in FIG. 2b, a user rotates the first bar 300 to the second position 320 when an emergency situation is raised such that tray 100 must be ejected. Simultaneously, the second end 302 of the first bar 300 pushes the third end 403 of the second bar 400 to disengage the first latch 710 from the first protrusion 510. The tray 100 is then released from housing 200, and the user can remove or place a disc on the tray 100.

As shown in FIGS. 2a and 2b, the first bar 300 is connected with one end of the spring 630 (the first spring), and the other end of the spring 630 is connected with tray 100. When the first bar 300 is in the first position 310, which is illustrated in FIG. 2a, the spring 630 keeps relaxed. In other words, no stretching or compression force is applied thereon. When the first bar 300 moves to the second position 320, which is illustrated in FIG. 2b, a force is applied on the spring 630. The force applied on the spring 630 is a stretching force. In other preferred variations of the design, the force applied on the spring 630 may also be a compression force. After the stretch, the elastic force of spring 630 makes the first bar 300 move back to the first position 310.

As shown in FIGS. 2a and 2b, the second bar 400 is connected with one end of the spring 631 (the second spring), and the other end of the spring 631 is connected with the tray 100. When the first bar 300 is in the first position 310 as shown in FIG. 2a, the second bar 400 is not pushed by the first bar 300, and the spring 631 keeps relaxed, which means no stretching or compression force is applied thereon. When the first bar 300 moves to the second position 320 as shown in FIG. 2b, the second end 302 of the first bar pushes the third end 403 of the second bar, which makes the second bar 400 pushed by the first bar 300. The second bar 400 now leaves its original position, and a force is applied on the spring 631. The force applied on the spring 631 is a stretching force. However, in other preferred variations of the design, the force applied on the spring 631 may also be a compression one. After the stretch, the elastic force of spring 631 makes the second bar 400 move back to the original position.

As shown in FIGS. 2a and 2b, the disc drive further includes a disc-ejection mechanism 800 with a spring 810 (the third spring). One end of the disc-ejection mechanism 800 is connected with housing 200, and the other end is connected with tray 100. When tray 100 is received in the housing 200, the spring 810 is either stretched or compressed. As the embodiment in FIG. 2a shows, when tray 100 is entering the housing 200, the tray 100 pushes one end of the disc-ejection mechanism 800 and makes the spring 810 become stretched. When the first latch 710 disengages from the first protrusion 510, the spring 810 supplies an elastic force to eject a part of the tray 100 out of the housing 200.

The disc drive further includes a panel 610, which is shown in FIGS. 2a and 2b. The panel 610 is connected with the front edge of tray 100. The first end 301 of the first bar 300 sticks out of the panel 610 to be operated by users. The panel 610 has a hole (not illustrated here), and the first end 301 of the first bar 300 sticks out of panel 610 through the hole.

Figure 3A:
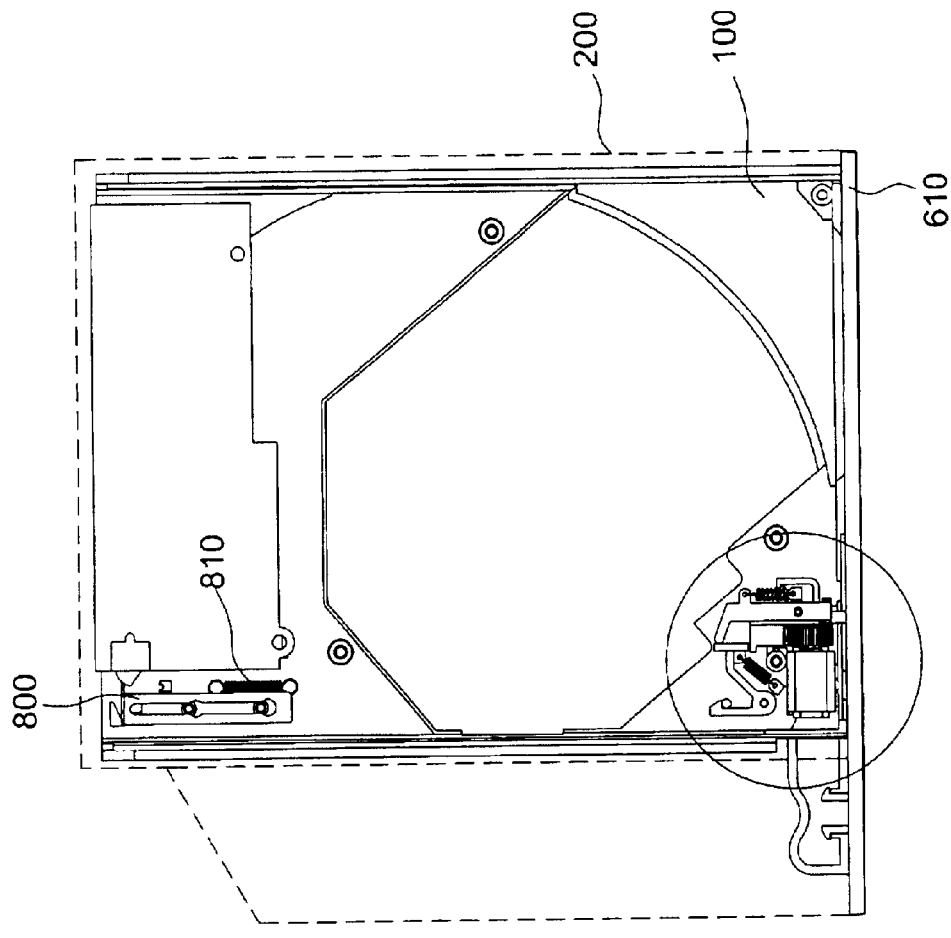
FIG. 3a shows a top view of another embodiment of the present invention with the first bar in the first position.
Figure 3A:
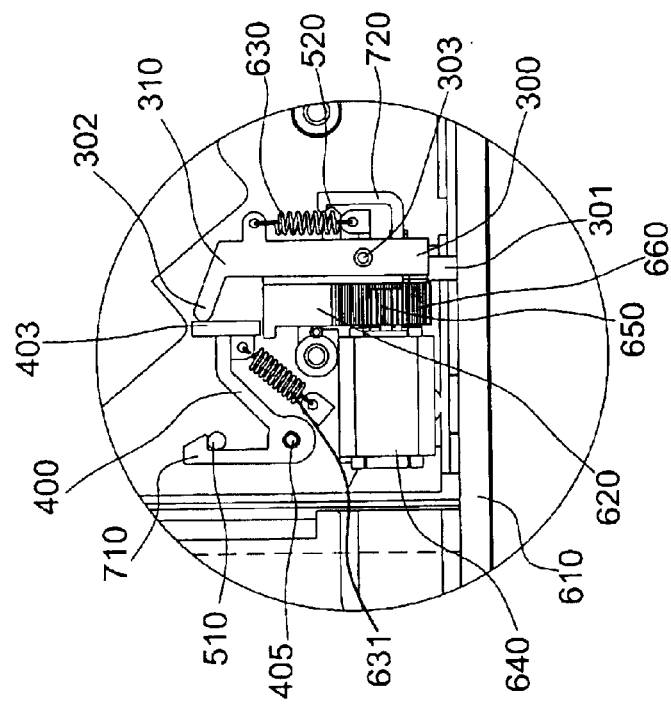
Figure 3B:
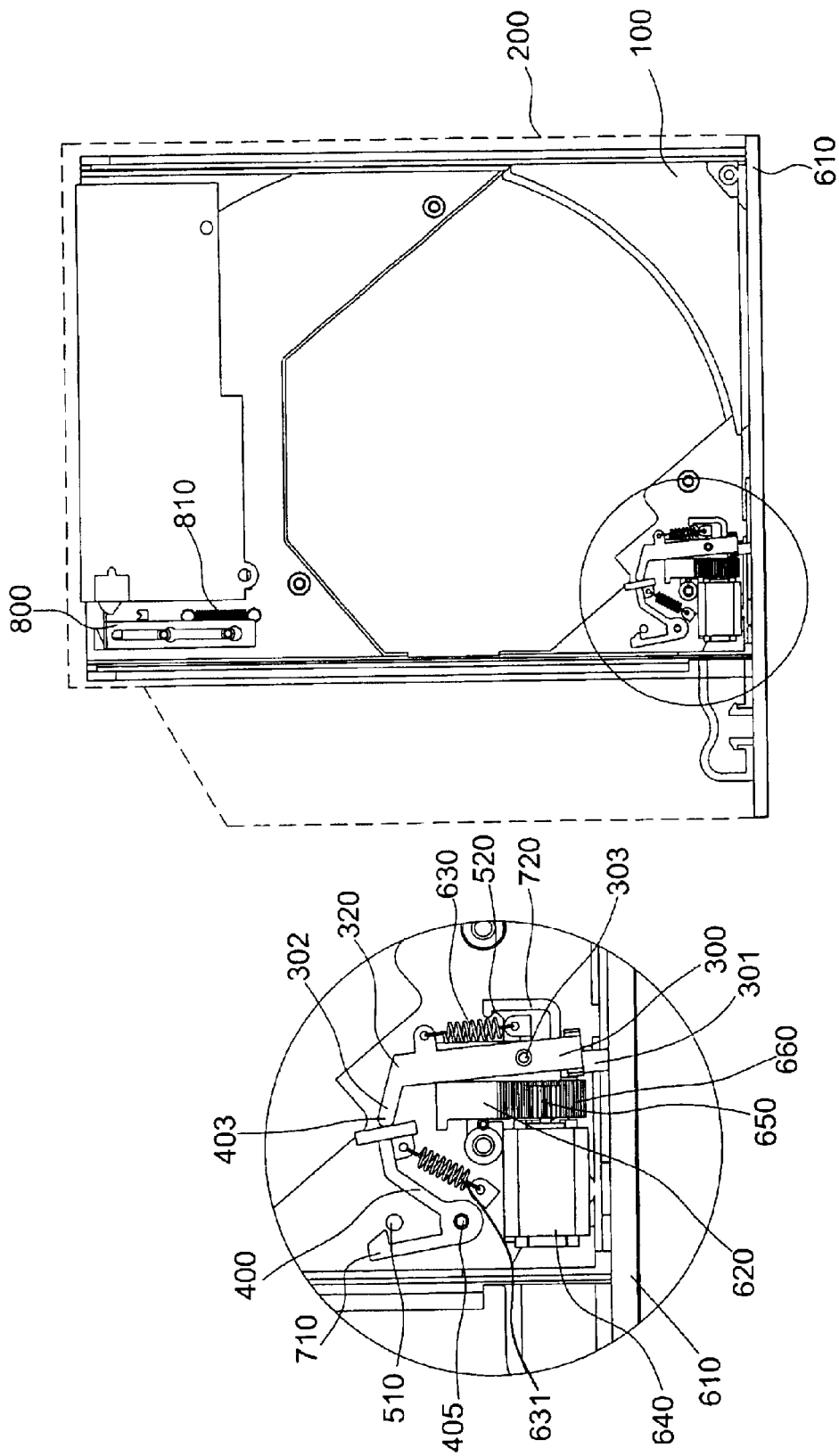
FIG. 3b shows a top view of another embodiment of the present invention with the first bar in the second position.

FIGS. 3a and 3b are the perspective view of the second embodiment of the subject invention. Please refer to FIGS. 2a and 3a. In order to prevent the first end 301 from being accidentally touched by a user while the disc drive is in operation, the emergency ejection device further includes a sliding unit 620 movably connected with tray 100. The sliding unit 620 is slidably connected with tray 100 via a set of tracks. However, the sliding unit 620 may also be movably connected with tray 100 via a slot device or anything else with similar functions. The first bar 300 is rotatably connected with sliding unit 620 via the pivot 303. In the first embodiment, with the use of the sliding unit 620, first bar 300 can slide touching against tray 100 to make first end 301 of the first bar 300 stick out of the panel 610 as shown in FIG. 2a. In the second embodiment, the first end 301 may move inside the panel 610 with the use of the sliding unit 620, which is shown in FIG. 3a.

When the disc drive is in operation, the sliding unit 620 makes the first end 301 of the first bar 300 move inside the panel 610. When the disc drive is not in operation, the sliding unit 620 makes first end 301 stick out of the panel 610. However, while the disc drive is in operation, and experiences power-cut or situations where it cannot operate normally; the tray 100 must then be urgently ejected. In such cases, a user may insert a pin into the hole of the panel 610, which will move the first end 301 and make the first bar 300 move to the second position 320 so as to release tray 100, as shown in FIG. 3b.

Figure 4:
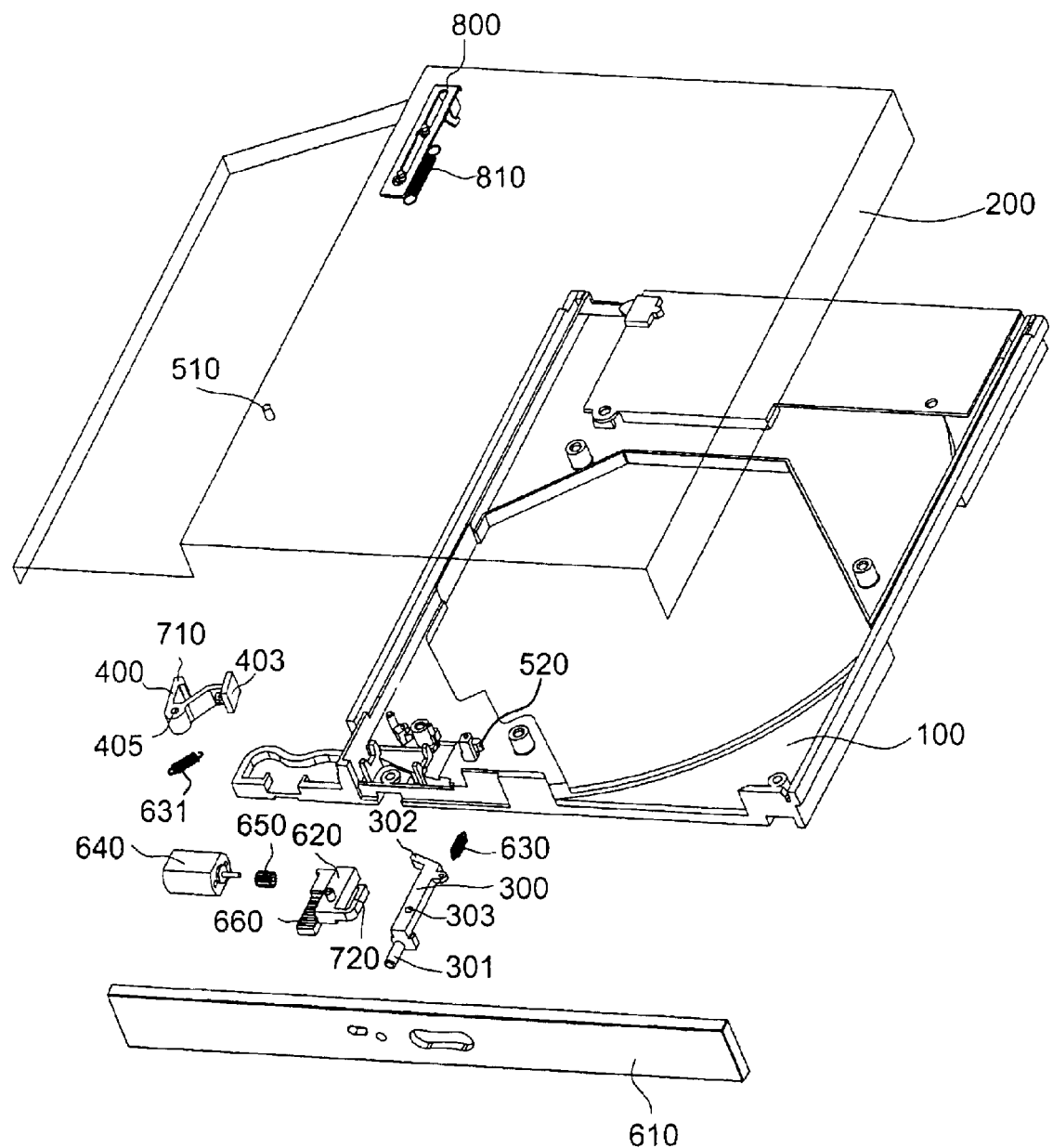
FIG. 4 shows an explosive view of the emergency ejection device of the subject invention.

FIG. 4 is an explosive view of the emergency ejection device. The emergency ejection device further includes a motor 640 with a gear 650. The motor 640 is fixed on the tray 100. Additionally, the sliding unit 620 includes a rack 660, engaging with the gear 650. The motor 640 supplies power to drive the gear 650 and then drive rack 660. Therefore, the sliding unit 620 will slide touching against tray 100 and drive the first end 301 of the first bar 300 to stick out of the panel 610 or move back inside the panel 610, as shown in FIG. 2a or 3a. It is noticed that the application of the subject invention does not exclude other possible combination than that of the gear 650 and the rack 660 for driving the first end 301 of the first bar 300 to stick out of the panel 610 or move back to the panel 610. In other embodiments, any combinations which function similarly may operate with the motor 640 to drive the first end 301 of the first bar 300.

As shown in FIG. 4, the sliding unit 620 includes a second latch 720, and the tray 100 has a second protrusion 520. The second latch 720 is an elastic component. When the first end 301 of the first bar 300 sticks out of the panel 610, the second latch 720 is separated from the second protrusion 520, as shown in FIG. 2a. When the sliding unit 620 drives the first end 301 of the first bar 300 positioned inside the panel 610 as shown in FIG. 3a, the second latch 720 engages with the second protrusion 520 so that the relative positions of the sliding unit 620 and tray 100 remain unchanged.

As the second embodiment shown in FIG. 3a, the sliding unit 620 is driven by the motor 640. After the first end 301 moves inside the panel 610, the motor 640 then ceases to supply the power. Nevertheless, the spring 630 that connects first bar 300 and tray 100 generates a pulling force because the first bar 300 has changed its position. At that moment, the second latch 720 engages with the second protrusion 520 to resist the pulling force from the spring 631 and keeps the sliding unit 620 staying in the same position relative to tray 100.

Figure 5:
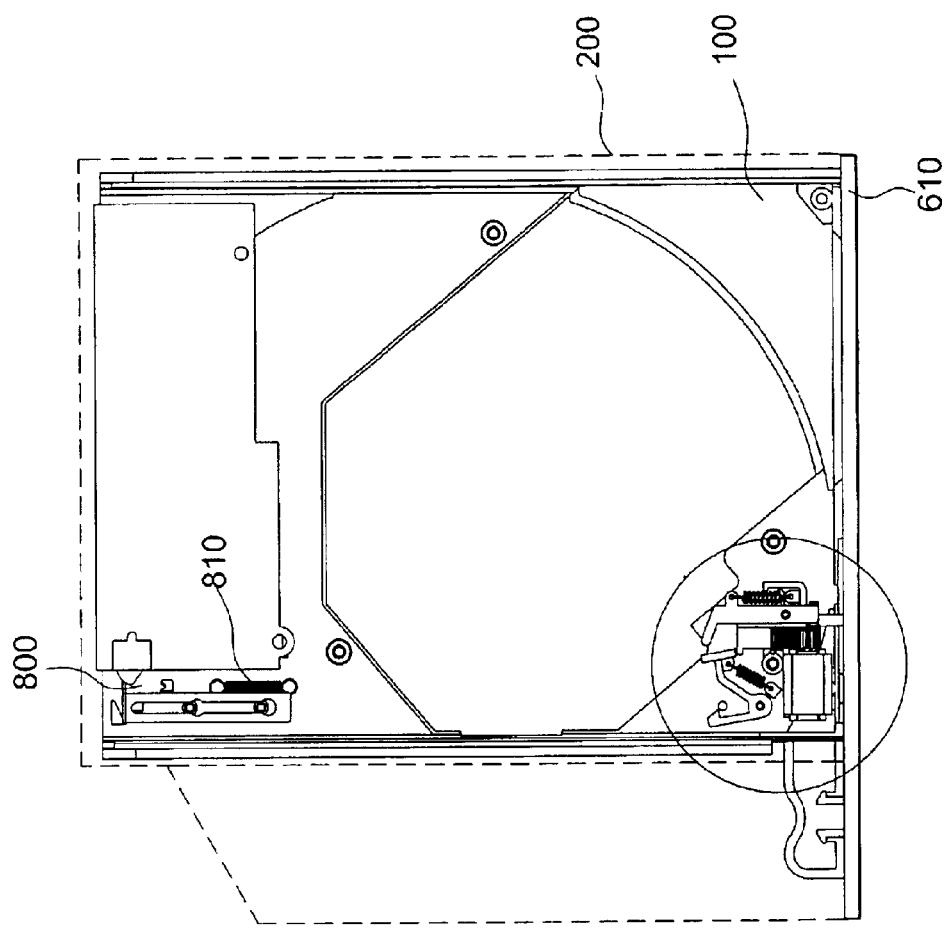
FIG. 5 shows a top view of another embodiment of the subject invention.
Figure 5:
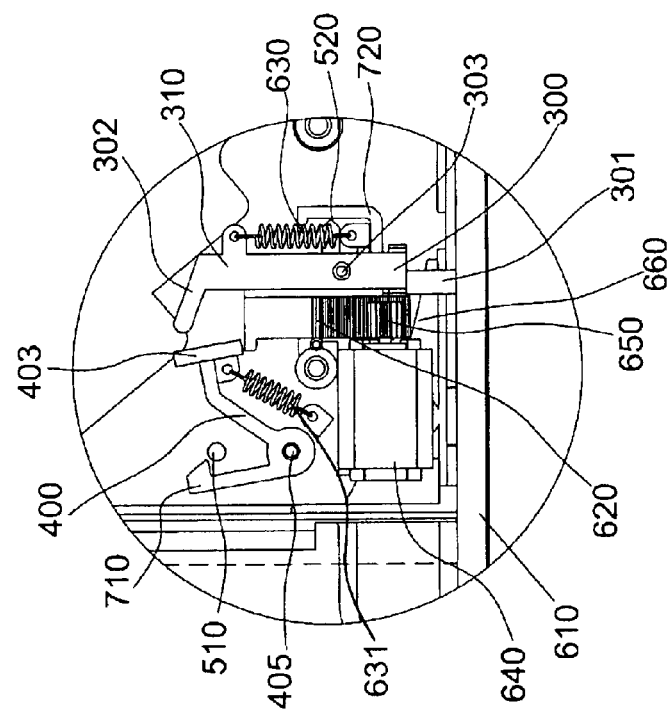

As shown in FIG. 5, one end of the sliding unit 620 is located touching against one end of the second bar 400. When a user intends to eject tray 100 out of housing 200 in normal operation, the sliding unit 620 is driven by the motor 640 and the second bar 400 is moved. The first latch 720 then disengages from the first protrusion 520. At the same time, the aforesaid disc-ejection mechanism 800 can eject apart of tray 100 out of housing 200.

By means of the detailed descriptions of what is presently considered to be the most practical and preferred embodiments of the subject invention, it is the expectation that the features and the gist thereof are plainly revealed. Nevertheless, these above-mentioned illustrations are not intended to be construed in a limiting sense. Instead, it should be well understood that any analogous variation and equivalent arrangement is supposed to be covered within the spirit and scope to be protected and that the interpretation of the scope of the subject invention would therefore as much as broadly apply.

I claim:

1. An ejection device for use in a disc drive, said disc drive comprising a tray and a housing, said ejection device comprising:
    a first bar having a first end, a second end and a first supporting point, said first bar being rotatably connected with said tray via said supporting point;
    a second bar having a third end and a first latch, said third end being opposite to said second end, and said second bar being movably connected to said tray; and
    a first protrusion formed corresponding to said first latch and connected with said housing;
    wherein said first latch is engaged with said first protrusion to prevent said tray from moving relative to said housing when said first bar is placed at a first position, and after said first bar rotates to a second position, said second end of said first bar contacts said third end to push said second bar so as to separate said first latch from said first protrusion for releasing said tray.

2. The ejection device as claimed in claim 1, wherein said disc drive further comprises a panel connected with a front edge of said tray, and said first end of said first bar is extended out of said panel.

3. The ejection device as claimed in claim 2, wherein said ejection device further comprises a sliding element movably connected with said tray, said first bar is rotatably connected with said sliding element via said supporting point, and selectively moving said first end of said first bar back inside said panel.

4. The ejection device as claimed in claim 3, wherein said ejection device further comprises a motor pivotally connected with a gear, said sliding element has a rack engaged with said gear, wherein said motor drives said sliding element to move said first end of said first bar back inside said panel.

5. The ejection device as claimed in claim 3, wherein said sliding element further comprises a second latch, said tray has a second protrusion, and after said first end of said first bar moves back into said panel, said second latch engages with said second protrusion to prevent said sliding from moving related to said tray.

6. The ejection device as claimed in claim 1, wherein said first bar is connected with said tray via a first spring, and after the first bar rotates to said second position, said spring provides an elastic force to move said first bar back to said first position.

7. The ejection device as claimed in claim 1, wherein said second bar is connected with said tray via a second spring, and when said second bar is pushed away from an original position to separate said first latch and said first protrusion, said second spring provides an elastic force to move said second bar back to said original position.

8. The ejection device as claimed in claim 1, wherein said disc drive has a disc-ejection mechanism, said disc-ejection mechanism has a third spring, one end of said disc-ejection mechanism is connected to said housing and the other end of said disc-ejection mechanism is connected to said tray, and said third spring provides an elastic force to eject a part of said tray out of said housing when said second bar is moved and said first latch is separated from said first protrusion.

9. The ejection device as claimed in claim 1, wherein said second bar has a second supporting point, and said second bar is movably connected with said tray via said second supporting point.

10. The ejection device as claimed in claim 1, wherein said first protrusion is a cylindrical protrusion.

* * * * *